UNITED STATES PATENT OFFICE.

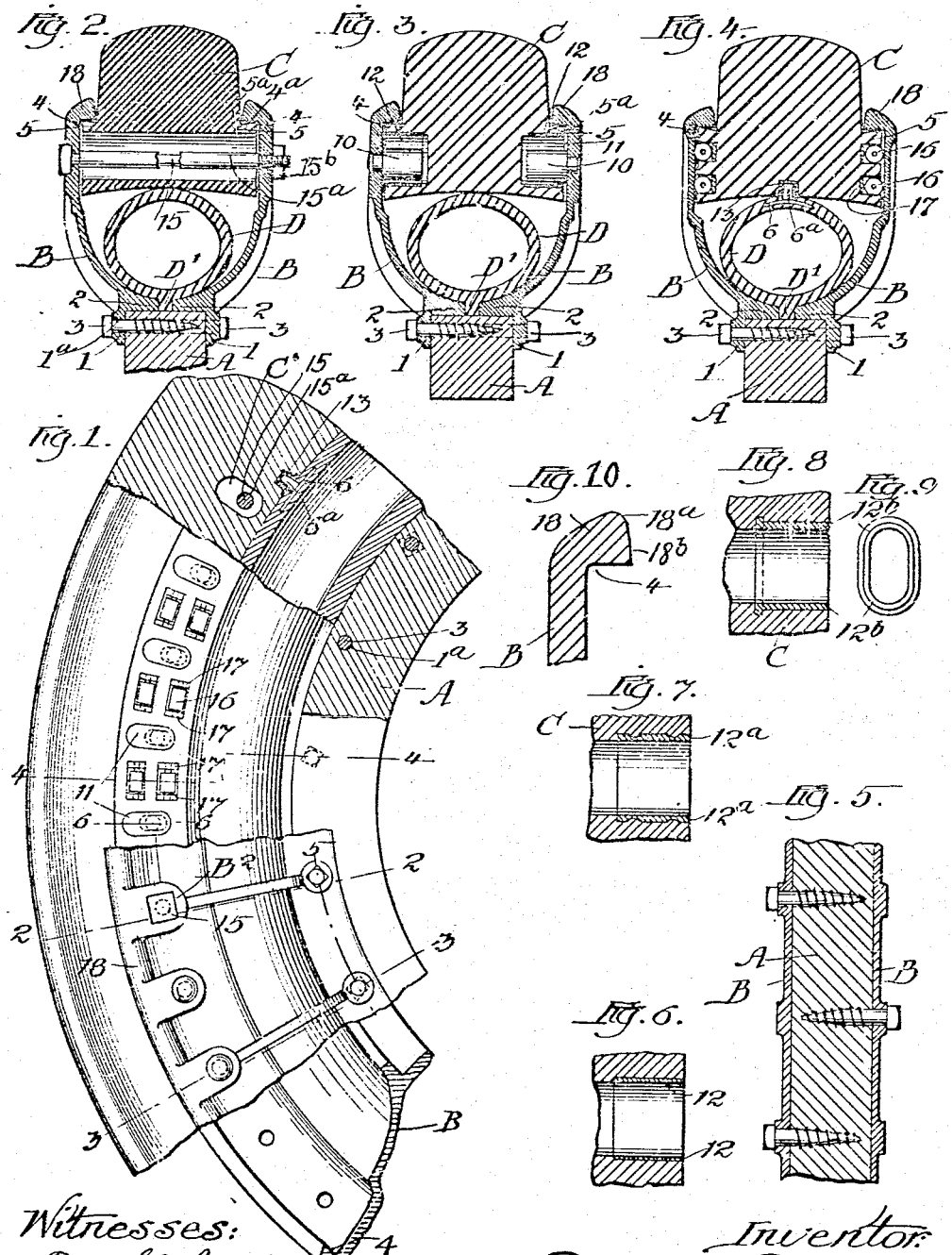

MELVILLE CLARK, OF CHICAGO, ILLINOIS.

VEHICLE-WHEEL AND TIRE.

1,008,116.     Specification of Letters Patent.     Patented Nov. 7, 1911.

Application filed August 28, 1909. Serial No. 515,042.

*To all whom it may concern:*

Be it known that I, MELVILLE CLARK, a citizen of the United States, residing at Chicago, in the county of Cook and State of Illinois, have invented new and useful Improvements in Vehicle-Wheels and Tires, of which the following is a specification, reference being had to the drawings forming a part thereof.

The purpose of this invention is to provide an improved construction of vehicle wheel rim and tire especially adapted for service on motor vehicles, such as automobiles, auto trucks and the like for road and street service.

It consists in the elements and features of construction shown and described as indicated in the claims.

In the drawings; Figure 1 is a partly sectional side elevation of a segment of a vehicle wheel rim and tire thereon embodying this invention, the outer guard being partly broken away over one portion of the figure, and a section at another portion being made at the center of the tire in a plane transverse to the wheel axis. Fig. 2 is a section at the line 2—2 on Fig. 1. Fig. 3 is a section at the line 3—3 on Fig. 1. Fig. 4 is a section at the line 4—4 on Fig. 1. Fig. 5 is a detail section at the curved line 5—5 on Fig. 1. Fig. 6 is a detail section at the line 6—6 on Fig. 1. Fig. 7 is a similar view showing a slight modification. Fig. 8 is a similar view showing a further modification. Fig. 9 is a detail plan view of the reinforcement shown in Fig. 8. Fig. 10 is a detail section of the outer rim of one of the guards.

In the drawings, A represents the wood felly of a vehicle wheel.

B, B, are metal guard plates secured to the felly for forming between them and outside the periphery of the felly a tire seat, in which a cushion tire may be retained and guarded as hereinafter more particularly set out. Each of the guard plates comprises for engagement with the felly by seating thereon, an annular flange, 1, transverse to the wheel axis and extending along the side of the felly, and an annular flange, 2, at right angles to the flange, 1, which seats upon the periphery of the felly, extending toward the middle of the width of the latter, the aggregate width of said flanges, 2, 2, of the guard plates B, B, being less than the width of the periphery of the felly by an amount sufficient for engaging between them the flange $D^1$, of the inner tube, as hereinafter more particularly described. The guard plates are secured to the wood felly by screws, 3, 3, of the general character of lag bolts having relatively deep and narrow threads, such bolts being set through smooth bored apertures $1^a$, in the flanges 1, the bolts from one side alternating with the bolts from the other side, resulting in a staggered arrangement, and such bolts being long enough to nearly penetrate the wood felly, so that the bolts from the two sides lap by each other for the greater part of the width or thickness of the felly, thereby defeating any tendency of the lateral stress upon the two guard plates to split the felly.

Each of the plates, B, is formed on its inner face a short distance inward from the outer circumference with an annular recess or pocket 4, which is designed to accommodate an outwardly projecting annular flange, 5, formed on the cushion tread member, C, of the tire for engagement with such seats to retain such tread element in place between the guards. The width, or dimension radially with respect to the wheel, of the annular recess or seat 4, is greater than that of the annular flange, 5, by an amount designed to accommodate the yielding of the cushion tread, C, inwardly under the load compressing the inflated inner tube, D, which is lodged between the said cushion tread member which encompasses it, and the flanges 2, 2, of the guards, B, which encompass the rim. It may be understood that the inflatable tube D, is of usual construction for automobile service, being composed of rubber and embedded fabric so as to be impervious to air and non-stretchable, and strong enough to bear the load and endure the service required of it, when properly inflated, without bursting, the form of the cavity or space in which it is lodged not being adapted or designed to afford it support or reinforcement upon all sides, the intention, on the contrary, being that it shall operate as a cushion when duly inflated, by virtue of its tendency to assume a transversely circular form, from which it is forced to an oval or flattened form by the load, but without being thereby widened enough to reach the lateral confines of the chamber in which it is detained, and, therefore, without liability of becoming chafed by rubbing against the inner surface of the guard plates B, which are the lateral walls of its chamber.

In order to prevent the inner tube, D, from rolling or sliding laterally out of central position in its chamber, and so preventing it from chafing against the side walls, or becoming twisted, with the resultant liability of cracking or forming wrinkles which become chafed resulting in fissures, they are incorporated with the fabric layers of such tube, D, lug plates, 6, distributed at short intervals about the outer circumference, having lugs 6ª, projecting radially with respect to the tube and also with respect to the wheel for engagement with the cushion tread member, C, in metal-lined sockets, 13, which are embedded in the latter.

To prevent the inner tube, D, from "creeping" around the wheel, it is formed with an annular flange, D¹, which projects inwardly at the inner circumference of said tube for engagement throughout the entire circumference between the facing edges of the flanges, 2, 2, of the guard plate, B, the thickness of said flange, D, being enough greater than the interval between said facing edges when the guards are practically bound up against the felly to cause said flange D¹, to be tightly compressed and gripped in thus drawing up the last applied guard plate by means of the securing bolts.

For increasing the effectiveness of the engagement of the lateral flanges, 5, of the cushion tread C, with the guard plates, B, and for preventing the tread from "creeping" there are provided studs, 10, oblong in cross section, projecting at frequent intervals in the circumference of the guard plates from the wall or vertical web of the annular seats, 4, of the guard plates into pockets 11, which are formed at corresponding intervals in the outwardly facing surface of the flanges, 5. Preferably, the studs 10, are suitably secured, as by riveting, to the guard plates, rather than being formed integrally with them, because in this manner they can be made of polished rod and less liable to chafe the sides of the pockets, 11, in which they engage. The studs, 10, and the pockets 11, are relatively positioned in the members to which they respectively pertain so that when the several members are assembled without load and without inflation of the inner tube the flanges, 5, have their outer corners remote from the wheel axis, (being the upper corner in the several transverse sectional views) lodged in the corresponding corner of the recesses, 4, their inner circumferences being separated from the inner circumferences respectively of said recesses, 4, by an amount estimated to be as great at least as any yielding which will occur under load when the inner tube, D, is duly inflated for sustaining the load; and the studs, 10, are located intermediate the ends of the radially elongated pockets, 11, being spaced from the inner end by an amount estimated to be equal to the lift or outward movement of the cushion tread, C, when the inner tube, D, is inflated, and being spaced from the outer ends of said pockets 11, by an amount a little more than the space between the inner circumference of the flange, 5, and the inner circumference of the recess, 4. The purpose and result of this relative spacing and positioning of the parts is, first, that when the inner tube is inflated and the wheel is under load, the outer end of the pockets, 11, stop against the studs, 10, a little later than the inner circumferences of the flanges, 5, stop against the inner circumferences of the seats, 4, but so that as the load continues or increases the compression of the substance of the cushion tread member which the load is forcing toward the studs eventually takes up the excess, bringing the outer ends of said recesses, 11, onto the studs, which, from that stage on, take a large proportion of the load and substantially carry the vehicle on the cushion tread member, C, and in order that the studs may properly transmit this load to the tread member, C, at its greatest depth or thickness in the direction of pressure, i. e. radially to the wheel, and not merely to the flanges, 5, the pockets, 11, are deeper and the studs, 10, are longer than the lateral protrusions of the flanges, as clearly seen in Fig. 3. It will be observed that as the wheel rolls on the ground and the load comes successively over the several studs, each in its turn will travel in and out along the pockets 11, and that the constant tendency of the traction to cause the tire to creep around the wheel will be liable to cause the studs to rub against one side of the pockets as they thus move in and out along the same. To prevent wearing away the wall of the pockets, they are preferably reinforced by a lining of more stubborn material than the rubber of the tread. Such lining may be of canvas which is represented in Fig. 6, denoted by the numeral 12, or by the sole leather denoted, 12ª in Fig. 7, or by the metal denoted by 12ᵇ in Fig. 8. When canvas is employed, it is readily incorporated with or thoroughly adherent to the rubber requiring no specific means of attachment other than such adherence. When sole leather is employed it it preferably nicked or notched as shown at Fig. 7, to afford engagement of the rubber therewith. When metal is employed, the metal thimble, 12ᵇ, is retained by a flange b, at the inner end. In all these methods, the lining element, whether of canvas, leather or metal, is placed in the mold and incorporated with the cushion tread, C, in molding, in a manner which will be readily understood by those acquainted with the art, and not requiring further explanation here.

The two guard plates, B, B, require connection extending across the plane of the wheel in addition to their rigid fastening to the felly to prevent them from being spread by lateral pressure of the tire in travel; and for that purpose, bolts, 15, are extended from one guard to the other, suitable apertured bosses, B², B², being formed on the guards to accommodate the bolts, and the cushion tread, C, having apertures, C¹, extending through it transversely of the wheel to accommodate the bolts, such apertures being elongated radially with respect to the wheel to accommodate the yielding of the cushion tread of the load, and being enough wider than the diameter of the bolts to avoid friction against the latter, which, it will be observed will be prevented by the studs, 10, engaging the recess, 11, and stopping the circumferential crowding of the tread except to the very limited extent of the compression of the substance of the tread which may occur at the engagement of said studs in the recesses or pockets, 11.

In the absence of provision to the contrary, very severe friction and consequent heating of the cushion tread results from the rubbing of the lateral surface of the tread element, C, against the sides of the guard plates, B, as the tread is compressed from below, and yields not only the amount of that compression but also the amount of the yielding of the inner tube, D, under the load. This friction is relieved and the heating of the cushion tread substantially prevented by providing at short intervals in the circumference anti-friction rollers, 16, mounted in metal bearing chairs, 17, embedded in the side of the tread, C, with a slight segment of the roll protruding beyond the lateral surface of the tread and bearing against the inner surface of the guard plate. Preferably these anti-friction rolls are provided in two series concentric with each other so that they stand in pairs, the two of each pair being in radial line. This is important because if there were but one roller at any given radial line, the lateral tread which would force the tread against the guard would cause it to fulcrum over the one roll, whether it was the outer or the inner one, and be forced against the guard, outwardly from the roll at the same side if it were the outer roll; but by providing the two rolls in radial line and positioning the rolls opposite each other at the opposite sides of the tread for engagement with the opposite guard plate, the tread is practically guarded from contact with the guard plates in the movement which would chafe it thereagainst.

In order to permit the bolts to be secured tightly without drawing the guards inward—toward each other—but on the contrary keeping them spaced apart so that the anti-friction rollers 16 may roll freely on the inner surface of the guards as described, the bolts are each provided with a spacing sleeve 15ᵃ whose ends form stop shoulders against the inner surface of the guards. The nut 15ᵇ can now be set tight without clamping the rubber tread element.

The outer shoulders of the flanges, 5, of the tread, C, are inclined inwardly with respect to the plane of rotation of the wheel, and the inwardly facing shoulders, 4ᵃ, of the recesses, 4, which engage the inwardly inclined shoulders, 5ᵃ, are cylindrical,—that is, parallel to the axis of the wheel. From the relative form of these two shoulders, it results that the flanges, 5, engage the recesses, 4, normally and before inflation of the inner tube only at the corners or outer circumferences of the shoulders, 5ᵃ, which seat in the corresponding corners of the recesses, 4, the two shoulders, 5ᵃ and 4ᵃ, diverging inwardly from each other. The purpose of this is that the shoulders may come into contact over their entire length when the inner tube is inflated; whereas, if they were in contact throughout before the inflation of the inner tube, such inflation forcing the tread outward at the middle part, would steadily reduce the engagement, tilting the flanges, 5, away from the shoulders, 4ᵃ, and leaving them engaged finally with the inner circumference of those shoulders which will reduce the area of resistance and engagement very materially.

To avoid chafing and wearing away the lateral surfaces of the tread, C, at the part which protrudes beyond the shoulders, 4ᵃ, and to prevent abrupt bending liable to produce rupture at the angle where the flange 5 sets off from the body of said tread member, and also to adapt the peripheral bead or flange, 18, which outwardly bounds the recess, 4, of the guard plate to endure contact with stones, car tracks and the like, without bending or indentation said peripheral bead of each of the guard plates is thickened toward the inner edge and said inner edge is slightly inclined outward as seen at 18ᵇ, and the outer corner of said edge is rounded as seen at 18ᵃ; and thereby, when the protruding portion of the tread, which is also slightly tapered as shown, is flexed sideward by the exigencies of travel, the bending is distributed over some distance from the angle between the body of the tread and the flange, 5, and the side of the tread member is stopped against said round edge, 18ª, whose form is such as to avoid tearing or seriously wearing the surface of the tread element folded against it.

I claim:

1. A vehicle wheel comprising in combination with the felly, guard plates secured thereto and forming between them a seat for a yielding tire, a tire lodged in such seat comprising a tread element or member of yielding material for cushioning and an inflatable tube interposed in the seat between the same and the tread element, the guard plates having inwardly opening recesses and the tread member having laterally projecting annular flanges entering said recesses less in dimension radial with respect to the wheel than the recesses, said flanges having radially elongated pockets at intervals in the circumference of the wheel extending in depth farther than the laterally extending dimension of the flanges, and rigid studs projecting from the bottom of the recesses into said pockets, spaced radially with respect to the wheel inward from the outer ends of the pockets.

2. A vehicle wheel comprising, in combination with the felly, guard plates secured thereto and forming between them a seat for the yielding tire; a tire lodged in such seat comprising a tread element of yielding material for cushioning; an inflatable tube interposed within the tread element; the guard plates having lateral inwardly opening annular recesses, and the tread member having lateral projecting annular flanges entering said recesses less in width than the latter, said flanges having at intervals in the circumference of the wheel radially elongated pockets deeper than the laterally extending dimension of the flanges; rigid studs projecting from the guard plates from the bottoms of the recesses into said pockets respectively, and reinforcements lining the pockets.

3. A vehicle wheel comprising in combination with a felly, guard plates secured thereto and forming, between them a seat for a yielding tire; a tire lodged in such seat comprising a tread member for cushioning, the guard plates having lateral inwardly opening annular recesses and the tread member having lateral annular flanges entering said recesses narrower than the latter; having roll-bearings embedded in the sides of the tread member and anti-friction rolls journaled therein for rolling in planes radial in respect to the wheel and protruding from the surface in which their bearings are thus embedded for bearing against and rolling upon the inner surfaces of the guard plates.

4. A vehicle wheel comprising in combination with a felly, guard plates secured thereto and forming between them a seat for a yielding tire; a tire lodged in such seat comprising a tread member for cushioning, the guard plates having lateral inwardly opening annular recesses, and the tread member having lateral annular flanges entering said recesses narrower than the latter; roll bearings embedded in the sides of the tread member and anti-friction rolls journaled therein for rolling in planes radial in respect to the wheel and protruding from the surface in which their bearings are thus embedded for bearing against and rolling upon the inner surface of the guard plates; such rolls being arranged in pairs, the two of each pair being substantially in line radially with respect to the wheel.

5. A vehicle wheel comprising in combination with a felly, guard plates secured thereto and forming between them a seat for a yielding tire; a tire lodged in such seat comprising a tread member for cushioning, the guard plates having lateral inwardly-opening annular recesses and the tread member having lateral annular flanges entering said recesses narrower than the latter; roll-bearings embedded in the sides of the tread member and anti-friction rolls journaled therein for rolling in planes radial with respect to the wheel and protruding from the surface in which their bearings are thus embedded for bearing against and rolling upon the inner surfaces of the guard plates; such roll bearings for the several rolls which are situated in different radial planes being independent of each other.

6. A vehicle wheel comprising, in combination with the felly, guard plates secured thereto and forming between them a seat for a yielding tire; a tire lodged in such seat comprising a tread member of yielding material for cushioning and an inflatable tube interposed between said tread member and the bottom of the seat; means by which said tube is bound at its inner circumference to the seat, such tube having incorporated with it metal lug plates provided with lugs projecting radially from the outer circumference, the tread member having at its inner circumference metal-lined pockets with which said lugs engage.

7. A vehicle wheel comprising in combination with a felly, guard plates secured thereto forming between them a seat for a yielding tire; a tire lodged in such seat comprising a tread element of cushioning material; the guard plates having inwardly opening annular recesses, and the tread member having outwardly projecting flanges engaged in such recesses, narrower than the latter; means for holding the tread member expanded and protruding between the guards yieldingly, said annular recesses in the guards being each outwardly bounded by an annular bead or inwardly projecting flange, such bead or flange having its inner edge slightly inclined outward and the outer or circumferential corner of said edge rounded.

In testimony whereof, I have hereunto set my hand at Chicago, Illinois, this twenty-sixth day of August, 1909.

MELVILLE CLARK.

Witnesses:
NORMAN L. BURTON,
M. GERTRUDE ADY.